United States Patent [19]

McCann

[11] Patent Number: 5,637,974
[45] Date of Patent: Jun. 10, 1997

[54] METHOD AND APPARATUS FOR HYBRID DIRECT-INDIRECT CONTROL OF A SWITCHED RELUCTANCE MOTOR

[75] Inventor: Roy A. McCann, Kettering, Ohio

[73] Assignee: ITT Automotive Electrical Systems, Inc., Auburn Hills, Mich.

[21] Appl. No.: 426,319

[22] Filed: Apr. 21, 1995

[51] Int. Cl.$^6$ .............................. H02K 19/10; H02P 8/00
[52] U.S. Cl. .......................... 318/701; 318/138; 318/254; 318/696
[58] Field of Search .................................. 318/254, 439, 318/561, 701, 696, 685, 721

[56] References Cited

U.S. PATENT DOCUMENTS

| | | | |
|---|---|---|---|
| 4,680,518 | 7/1987 | Kurakake et al. | 318/561 |
| 4,707,650 | 11/1987 | Bose | 318/685 |
| 4,739,240 | 4/1988 | MacMinn et al. | 318/696 |
| 4,772,839 | 9/1988 | MacMinn et al. | 318/696 |
| 4,933,620 | 6/1990 | MacMinn et al. | 318/696 |
| 4,959,596 | 9/1990 | MacMinn et al. | 318/254 |
| 5,097,190 | 3/1992 | Lyons et al. | 318/701 |
| 5,107,195 | 4/1992 | Lyons et al. | 318/701 |
| 5,140,243 | 8/1992 | Lyons et al. | 318/701 |
| 5,140,244 | 8/1992 | Lyons et al. | 318/701 |
| 5,214,365 | 5/1993 | Bahn | 318/701 |
| 5,325,026 | 6/1994 | Lyons et al. | 318/254 |

OTHER PUBLICATIONS

Elimination of Discrete Position Sensor and Current Sensor in Switched Reluctance Motor Drives; Ehsani, et al.,; IEEE Transactions on Industry Applications, vol. 28, No. 1, Jan./Feb. 1992, pp. 128–135.

Dual–Decay Converter for Switched Reluctance Motor Drives in Low–Voltage Applications; Ehsani, et al.; IEEE Transactions on Power Electronics, vol. 8, No. 2, Apr. 1993, pp. 224–230.

A Sliding Mode Observer Based Controller for Switched Reluctance Motor Drives, Husain, et al.,; 1994 IEEE; pp. 635–642.

New Modulation Encoding Techniques for Indirect Rotor Position Sensing in Switched Reluctance Motors; Ehsani et al.; IEEE Transactions on Industry Applications, vol. 30, No. 1, Jan./Feb. 1994; pp. 85–90.

Rotor Position Sensing in Switched Reluctance Motor Drives by Measuring Mutually Induced Voltages; Husain, et al.; IEEE Transactions on Industry Applications, vol. 30, No. 3, May/Jun. 1994, pp. 665–672.

*Primary Examiner*—Paul Ip
*Attorney, Agent, or Firm*—Thomas N. Twomey; J. Gordon Lewis

[57] ABSTRACT

A device for controlling a 4-phase 8-stator pole/6 rotor pole switched reluctance machine includes a microcontroller, a converter circuit for energizing the stator windings of the switched reluctance machine, four Hall sensors adapted to detect rotor position to a resolution of 15 mechanical degrees, a phase current sensor, and a phase voltage sensor. The controller is programmed to implement a rotor position estimator for generating an estimated rotor position signal corresponding to the position of the rotor. The estimator is implemented using an observer-based state variable motor model, and is responsive to the measured phase voltage, the measured phase current, and the transitions generated by the Hall sensors. The estimated rotor position signal is determined by running the observer model in parallel with the physical motor. The observer uses a phase current error signal, and a position error signal generated using the low resolution position transitions, to force the estimated rotor position state variable to converge. The generated estimated rotor position signal is substantially continuously-valued and is used by a commutation means programmed in the controller for controlling commutation of the machine phases.

17 Claims, 6 Drawing Sheets

$t_0 = t_{on}$
$t_f = t_{final}$; TIME TO CONVERGE $t_0^i$ = TIME TURN ON OF $i^{TH}$ PHASE

LOW SPEED

HIGH SPEED

FIG 9
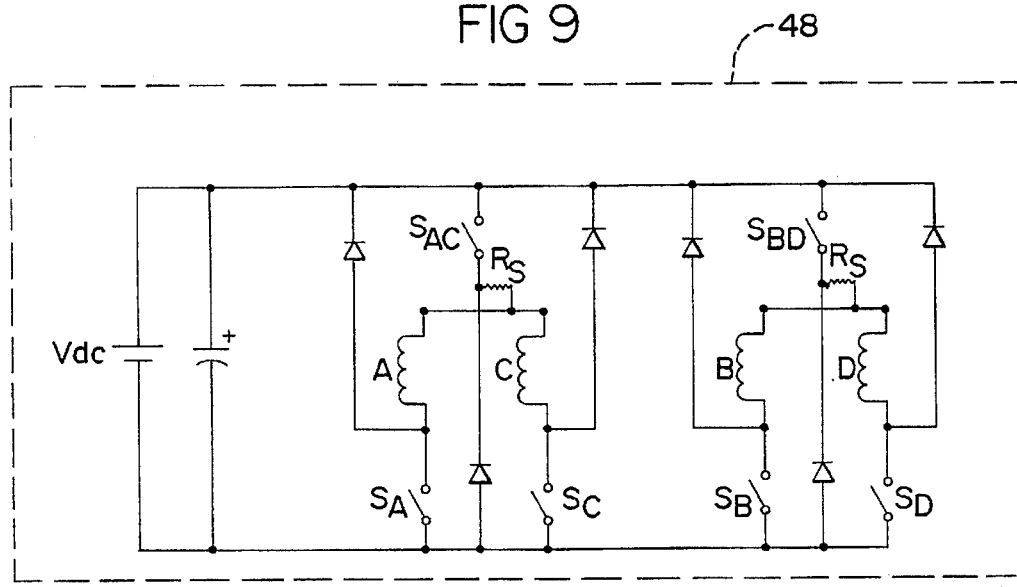
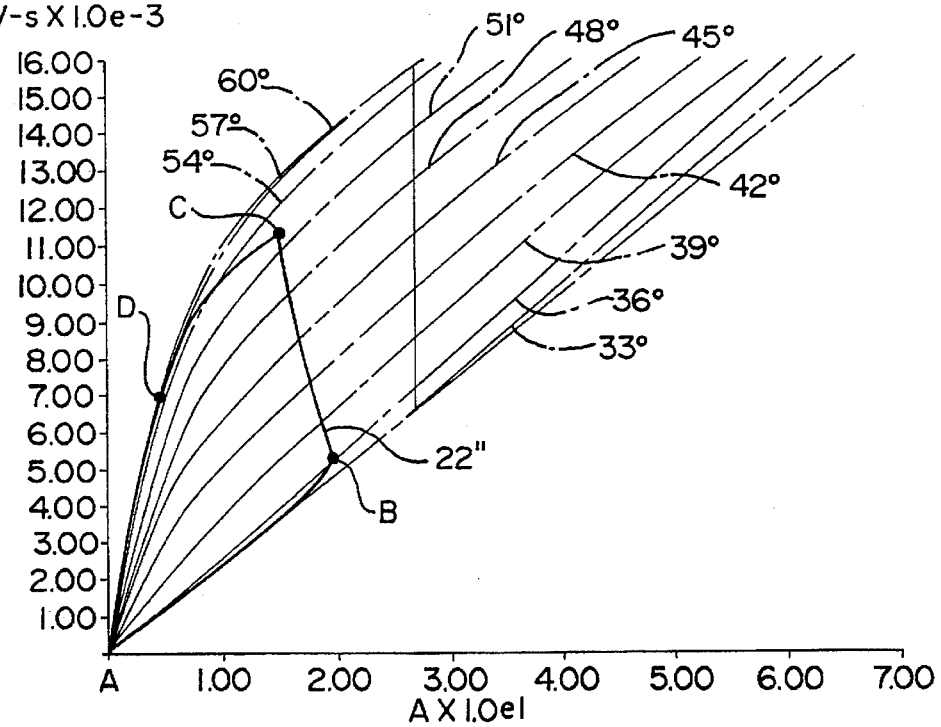
FIG 10

METHOD AND APPARATUS FOR HYBRID DIRECT-INDIRECT CONTROL OF A SWITCHED RELUCTANCE MOTOR

TECHNICAL FIELD

This invention relates generally to a system for controlling a switched reluctance motor, and, more particularly to a method and apparatus for determining a rotor position using an indirect motor model having a low-resolution direct rotor position input.

BACKGROUND OF THE INVENTION

Switched reluctance machines have been the subject of increased investigation of late due to its many advantageous characteristics, which make it suitable for use in a wide variety of applications. The switched reluctance machine operates on the basis of varying reluctance in its several magnetic circuits. Referring now to FIG. 1, a diagrammatic cross-sectional view of a prior art 4-phase, 8 stator pole/6 rotor pole switched reluctance motor (SRM) 10 is shown. SRM 10 includes a stator 12 having a plurality of stator poles 14, stator windings 16 (shown only on stator pole A for clarity), and a rotor 18 having a plurality of rotor poles 20. The stator poles 14 appear in pairs: i.e., A A', B B', C C', and D D'. The rotor poles 20 also appear in pairs, but usually in an unequal number as compared to the stator poles pairs. The stator windings 16 associated with diametrically opposite poles (e.g., A and A') are connected in series to form one machine phase. Thus, the windings on poles A and A' are referred to in the art as "phase A" of SRM 10. In the illustrated example, SRM 10 also has phase B, phase C, and phase D.

When a stator phase is energized, the nearest rotor pole pair is attracted towards the energized stator phase, thus minimizing the reluctance of the magnetic path. Therefore, by energizing consecutive stator phases in succession, it is possible to develop constant average torque, and thus rotation, in either direction. Thus, in the specific orientation shown FIG. 1, when phase D is energized, rotor 18 will rotate incrementally clockwise so that the rotor poles 20 nearest stator poles D D' are aligned. If phase A is next energized, rotor poles 20 nearest stator poles A A' will rotate to an aligned position. Accordingly, clockwise rotation of rotor 18 may be accomplished by successively energizing phases A, B, C, D, A, and so on.

The inductance of a winding (known as the "phase inductance") associated with a stator pole pair varies from a minimum when a rotor pole is unaligned with the corresponding stator pole, to a maximum when the rotor pole and the stator pole are aligned. Thus, as a rotor pole sweeps past a stator pole through unaligned-aligned-unaligned positions, the phase inductance varies through minimum-maximum-minimum values. The inductance versus rotor position characteristic is particularly important since for optimum torque production, the current flowing through a stator winding (i.e., known as the "phase current") must be switched on prior to and during the rising inductance period. Further, since positive phase current during the decreasing inductance interval generates negative torque, the phase current must be switched off before this interval to permit the current to decay completely so that no negative torque is produced. Accordingly, an accurate determination of rotor position (e.g., to within 1°) is necessary for precise control of the switched reluctance machine.

Two basic approaches have been practiced by the prior art to determine rotor position: direct methods and indirect methods. Direct methods relate to techniques that directly measure the rotor position, while indirect methods relate to techniques that determine rotor position without measured rotor position information.

The first approach, direct methods, may be further subdivided into "low-resolution" and "high-resolution" techniques. FIGS. 2 and 3 show low speed, and high speed operation, respectively, of a prior art switched reluctance machine equipped with "low resolution" position sensors. "Low resolution" in this context means detection with resolution no finer than one stroke angle, $\epsilon$, as determined by $\epsilon=(360°)/((\text{number of phases})(\text{number of rotor poles}))$. In the SRM 10, $\epsilon=15°$. Referring particularly to FIG. 2, the motor operation may be characterized by plotting flux linkage $\lambda$ versus phase current (i). The developed motor torque is proportional to the area inside a $\lambda$-i trajectory 22. The position sensors are physically configured so that a minimum torque ripple is achieved, which, for SRM 10, generally corresponds to maintaining energization of a motor phase between rotor angles 37° and 52° with respect to the position of rotor 18 shown in FIG. 1. Thus, as shown in FIG. 1, if the horizontal line through stator tooth C' indicates reference position 0° (i.e., with angular position referenced to increasing values in CCW rotation), then phase C will be energized when the rotor pole having the horizontal line therethrough has rotated CCW 37° from stator pole C', and deenergized at 52° from stator pole C'.

As shown in FIG. 2, this initial energizing point is indicated by point A. The trajectory 22 is then traversed to point B, where the phase current is limited to twenty amperes. Current flow through the energized phase is regulated at twenty amperes as the rotor position moves from 37° to 52° to reach point C. The winding is deenergized at point C, and the current decays to zero amperes. This is represented by path C-D-A.

Conventional motor control, using "low resolution" position sensing technology, maintains this same switching scheme (e.g., 37° to 52° energization) at all rotor speeds including high speed operation shown in FIG. 3. Thus, as shown in FIG. 3, the motor performance is substantially degraded at the higher motor speed, as shown by the significantly reduced area enclosed by $\lambda$-i trajectory 22'. Particularly note that due to the stator winding inductance, current build up is slowed. Combined with high motor speed, it is seen that the rotor pole quickly sweeps past the stator pole and the winding must be deenergized before current build up to a satisfactory level occurs. To maintain a $\lambda$-i trajectory similar to that depicted in FIG. 2, the turn-on angle, and the conduction angle (i.e., duration) of the energized stator winding must be continuously varied.

"High-resolution" sensing techniques have been implemented using optical encoders or resolvers to provide for the above-mentioned variable control. However, it should be noted that although this approach provides rotor position information sufficiently accurate for satisfactory motor operation over a broad operating range, such direct sensing techniques add cost, and reduce reliability.

The second basic approach, indirect methods, were pursued, in part, due to the shortcoming of the direct techniques. This general approach has taken a wide variety of forms. In one method, rotor position is determined indirectly by measuring winding inductances. Particularly, the inductance is measured by injecting a test signal into a normally de-energized stator winding, or by exciting a special sensing coil wound on a stator. As described above, since the inductance of a stator winding is a function of the rotor position adjacent to the stator pole, the rotor position may be determined indirectly. Another indirect method uses advanced control theory techniques, such as an observer-based state variable model, to estimate rotor position using at least one measured machine operating characteristic (excluding, of course, rotor position itself), such as phase current, phase voltage or the inductance of a deenergized stator winding. Although indirect methods are rugged and less expensive, motor performance is generally poor at the extremes of motor operating range; i.e., low speed high torque and high speed low torque conditions.

Accordingly, there is a need to provide an improved method and apparatus for determining a rotor position of a switched reluctance motor that minimizes or eliminates one or more of the problems as set forth above.

SUMMARY OF THE INVENTION

The present invention provides an improved system for determining the rotor position of a switched reluctance motor using a hybrid direct/indirect technique. A device for determining a rotor position in accordance with the present invention includes sensor means for generating a direct rotor position signal indicative of an actual position of the motor rotor, and a rotor position estimator. The rotor position estimator uses at least two signals, a measured machine operating characteristic, as defined above, and the generated direct rotor position signal, which together produce a continuously-valued estimated rotor position signal indicative of the rotor position.

In the preferred embodiment, the device further includes a voltage sensor for generating a phase voltage of an energized motor phase, and a current sensor for generating a phase current signal indicative of the current through the energized phase. The sensor means includes at least one low resolution position sensor for generating rotor position information at no greater resolution than one stroke angle; stroke angle being defined as:

$$\frac{360°}{(\text{number of phases}) (\text{number of rotor poles})}.$$

Further, the rotor position estimator includes an observer-based state estimator responsive to the measured machine operating characteristics of phase voltage and phase current, and the low resolution rotor position signal, for generating the estimated rotor position signal. Particularly, the estimated rotor position is periodically corrected by the measured rotor position (low resolution) to provide a highly accurate determination of rotor position at all angles. The novel combination of a low resolution position sensor and an indirect rotor position estimator provides several significant advantages over the prior art, including a reduced cost as compared to high resolution optical encoders or resolvers, increased reliability, and, unlike indirect methods alone, provides for superior motor operation over a wide speed range (including low speed and stalled conditions), which are characteristic of variable phase angle conduction systems hitherto only possible with high resolution optical encoder/resolvers.

In a second aspect of the present invention, a device for controlling a switched reluctance machine of the type having a rotor and plurality of stator windings forming a plurality of corresponding machine phases is provided. A device in accordance with this aspect of the present invention includes a rotor position sensor for detecting a rotor position and generating a direct rotor position signal indicative of the detected position, a rotor position estimator using at least two signals, the direct rotor position signal and at least one measured machine operating characteristic, for generating a continuously-valued estimated rotor position signal, and, finally, commutation means responsive to the estimated rotor position signal for controlling commutation of the machine phases.

In a third aspect of this invention, a method of controlling a switched reluctance machine is provided. This method is suitable for use in a system including a switched reluctance machine of the type having a rotor and a plurality of stator windings forming a plurality of corresponding machine phases. The method includes four basic steps. The first step involves generating at least one machine operating characteristic signal, which preferably includes generating a phase current signal and a phase voltage signal. The second step involves generating a direct rotor position signal indicative of an actual position of the rotor. The third step involves generating an estimated rotor position signal indicative of the position of the rotor using the machine operating characteristic signal, preferably the phase current signal and the phase voltage signal, and the direct rotor position signal. Finally, the fourth step involves controlling the switched reluctance machine using the estimated rotor position signal generated in the prior step. The controlling step is preferably performed by the substep of commutating the machine phases using the estimated rotor position signal.

These and other features and objects of this invention will become apparent to one skilled in the art from the following detailed description and the accompanying drawings illustrating features of this invention by way of example.

BRIEF DESCRIPTION OF THE DRAWINGS

FIG. 9 is a simplified schematic diagram view showing in greater detail the converter circuit of FIG. 5.

FIG. 10 is a flux linkage λ versus phase current (i) plot showing an improved λ-i trajectory during high speed operation due to phase advance control made possible with a device in accordance with the present invention.

DETAILED DESCRIPTION OF THE PREFERRED EMBODIMENTS

Figure 1:
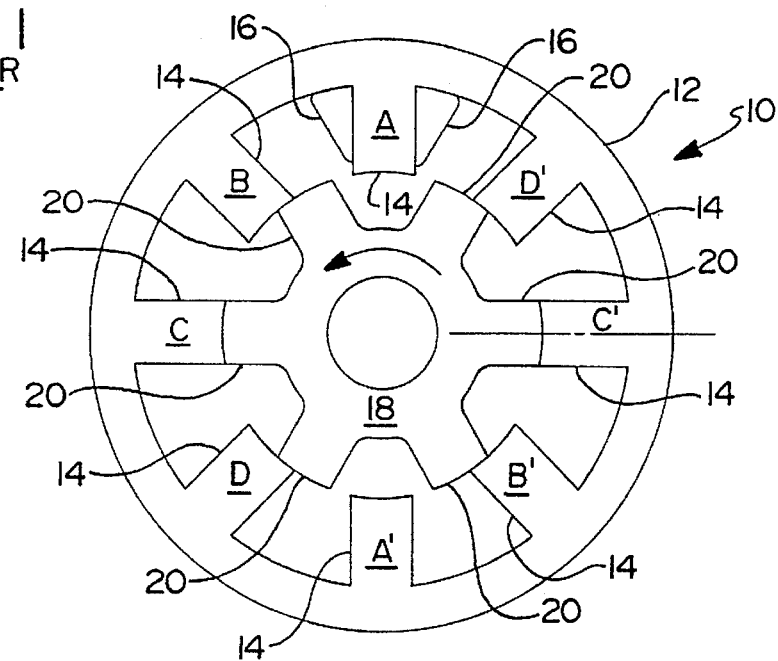
FIG. 1 is a diagrammatic cross-sectional view of a prior art 4-phase 8/6 switched reluctance machine, including a stator and rotor.
Figure 2:
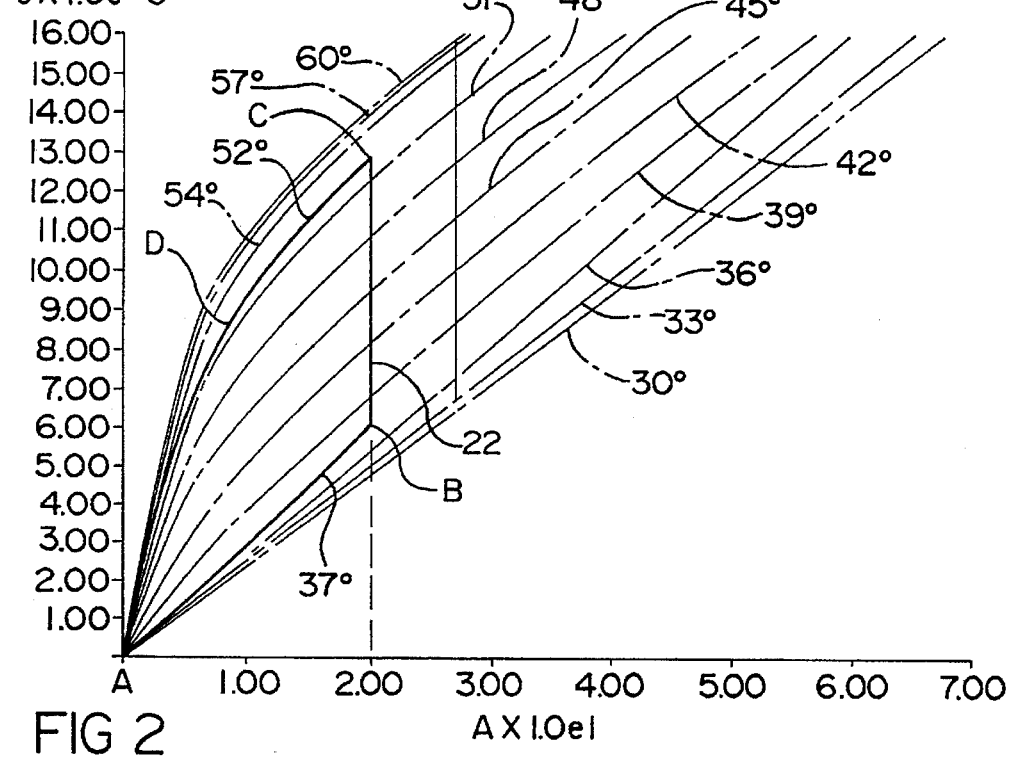
FIG. 2 is a flux linkage $\lambda$ versus phase current (i) plot parameterized with respect to rotor position for a prior art motor system during low speed operation using only low resolution sensors.
Figure 3:
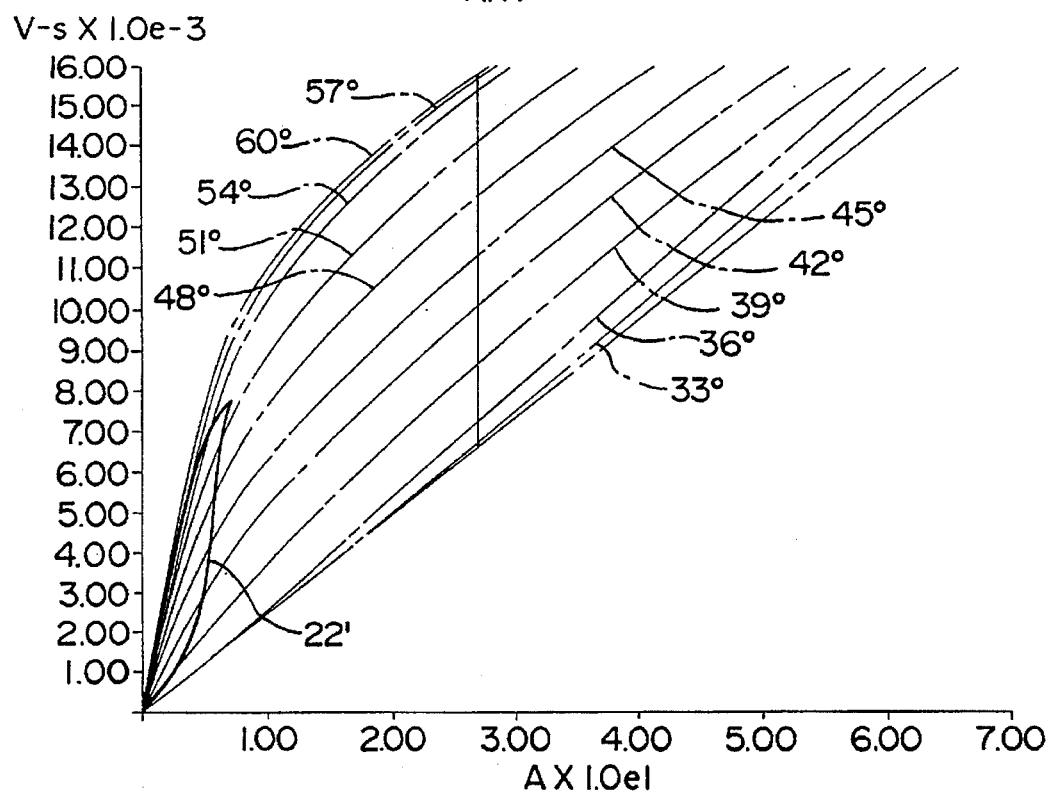
FIG. 3 is a flux linkage $\lambda$ versus phase current (i) plot parameterized with respect to rotor position for a prior art low-resolution sensor only system during high speed motor operation, particularly illustrating a significantly degraded $\lambda$-i trajectory.
Figure 4:
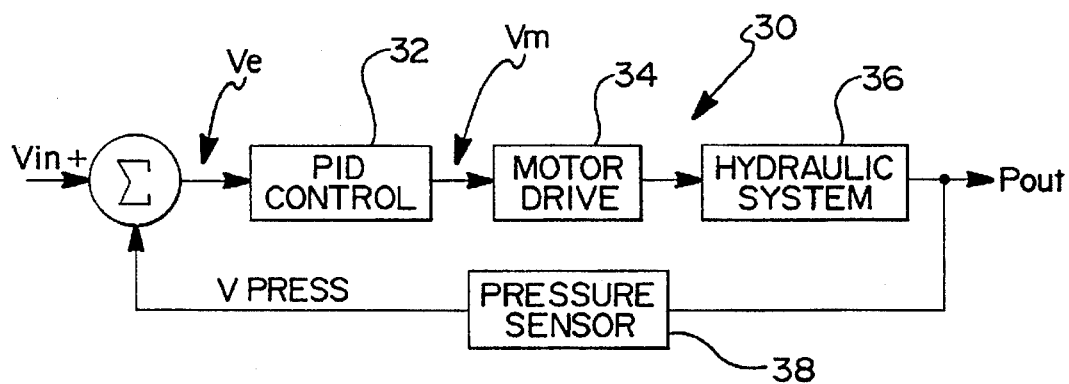
FIG. 4 is a simplified block diagram view of a hydraulic system in which the present invention may be advantageously employed.

Referring now to the drawings wherein like reference numerals are used to identify identical components in the various views, FIG. 4 shows a hydraulic pressure control system 30, an environment in which the present invention may be advantageously employed. System 30 includes a proportional-integral-derivative (PID) control 32, motor drive assembly 34, hydraulic system 36, and pressure sensor 38. In this typical application, the pressure of a hydraulic system ($P_{out}$), such as an automotive brake system, is controlled by a switched reluctance motor drive 34. The system 36 pressure is controlled by adjusting the force on a piston (not shown) that is attached to a rotary-to-linear converter, such as a lead-screw and ball-nut assembly. The closed loop system 30 responds to changes in an input pressure command signal $V_{in}$, which is indicative of an input pressure command $P_{in}$, to adjust $P_{out}$.

A step input command will be examined to illustrate operation of system 30. When the pressure command signal, $V_{in}$, changes from a value corresponding to 0 psi to a value corresponding to 1500 psi, an error signal ($V_e$), is created. The error signal is processed through PID controller 32, which is conventional in the art, and a control signal, $V_m$, is applied to motor drive 34. Motor drive 34 accelerates the hydraulic drive piston, which increases the system pressure $P_{out}$. Pressure $P_{out}$ is measured by pressure sensor or transducer 38, and generates a signal $V_{press}$, which is used in determining the error signal $V_e$. Once the error signal $V_e$ goes to 0, motor drive 34 responds to small changes in $V_{in}$ to hold the vehicle brake system at a desired output pressure. Thus, system 30 operates primarily in one of two modes: (1) fast acceleration and high speed for fast transient response to large step inputs, and (2) static loading with fine control in system pressure (or motor torque). Thus, for the typical application described above, low steady state torque ripple, and quick response to step inputs are important. However, rotor position errors that are characteristic of prior art indirect rotor position determining techniques make obtaining these desired performance objectives difficult.

Figure 5:
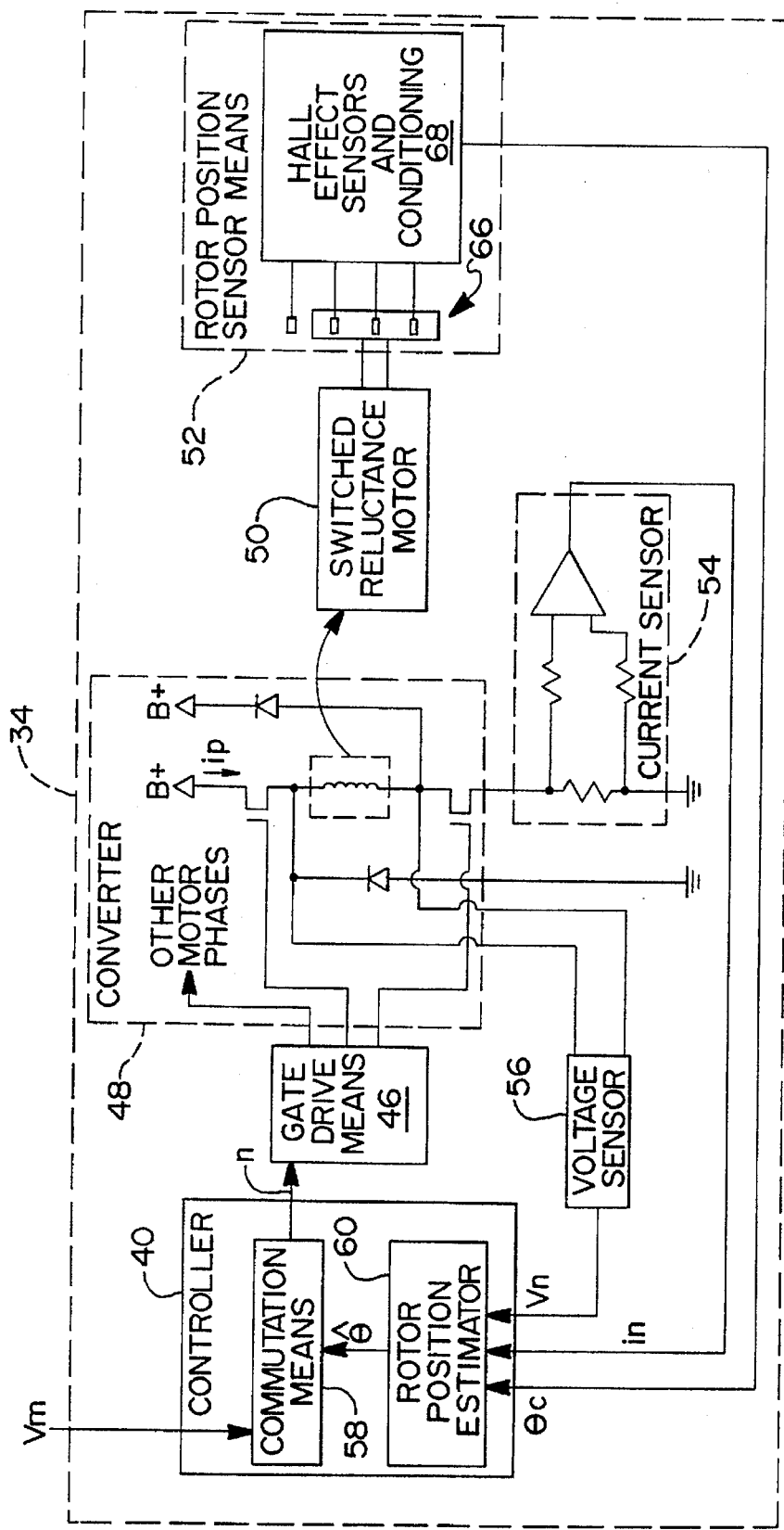
FIG. 5 is a simplified schematic and block diagram view of a device according to the present invention.

FIG. 5 shows motor drive 34 in greater detail. Motor drive 34 includes controller 40, gate drive means 46, converter circuit 48, switched reluctance motor 50, direct rotor position sensing means 52, current sensor 54, and voltage sensor 56.

Controller 40 is provided for generating signals to control switched reluctance motor 50. In the preferred embodiment, controller 40 is further provided for implementing commutation means 58, and rotor position estimator 60. Controller 40 is conventional in the art, and may be, for example, a 16-bit CPU model 80C196KR from Intel, having ON-chip erasable programmable read only memory (EPROM), random access memory (RAM), and a multi-channel analog-to-digital converter (ADC). The computational requirements of the controller 40 will, of course, depend upon the particular indirect technique chosen (described in detail below); however, the 16 MHz version of the 80C196KR, having a 1.75 μs 16×16-bit multiply and 3 μs 32/16-bit divide, has been found sufficient for implementing the preferred embodiment herein to be described in detail.

Gate drive means 46 is provided for interfacing logic level signals generated by controller 40 with the power-level signals required of converter 48.

Converter 48 is responsive to the drive signals from gate drive means 46 to energize selected machine phases (i.e., stator windings) in accordance with predetermined control criteria implemented on controller 40. The coil enclosed in the dashed-line box corresponds to one of the phases of motor 50.

Motor 50 may take any one of a plurality of configurations known and commercially available in the art. For example, 6/4, 8/6, and 12/8 (stator poles/rotor poles) are common configurations. In the preferred embodiment, a 4-phase 8/6 switched reluctance motor is used.

Direct rotor position sensing means 52 is provided for generating a direct rotor position signal indicative of the actual position of the rotor. Although sensing means 52 need only provide direct rotor position information in some fashion, preferably, sensor means 52 generates a transition signal that coincides with the commutation angle $\theta_c$ for each of the phases. Based on the use of an 8/6 SRM 50, the transition signal occurs every 15 mechanical degrees. Further, as will be discussed in greater detail, $\theta_c$ is selected to be 52° for each phase; thus, $\theta_c$ being predetermined, when controller 40 receives a transition, rotor position estimator 60 is able to determine that the actual rotor position is 52°.

Current sensor 54 is provided for detecting a current through each of the phase windings, and generating in response thereto a corresponding phase current signal $i_n$ indicative of the detected current.

Voltage sensor 56 is provided for detecting a voltage applied across each of the stator windings, and generating in response thereto a corresponding phase voltage signal $V_n$ indicative of the detected voltage.

As shown in FIG. 5, commutation means 58 is responsive to an estimated rotor position signal $\hat{\theta}$ for controlling commutation of the machine phases of motor 50. Various commutation strategies are known to one of ordinary skill in the art, and are conventionally implemented by way of software programs and data structures executing on a microcontroller, such as controller 40. Commutation means 58, in the preferred embodiment, generates signals sufficient to control each one of the n (n=4) phases of motor 50.

Rotor position estimator 60 is responsive to the direct rotor position signal $\theta_c$, and at least one measured machine operating characteristic, for generating the estimated rotor position signal $\hat{\theta}$, which is indicative of the position of the rotor. Preferably, the measured machine operating characteristics comprises the phase current signal and the phase voltage signal. Selection of these signals for a particular implementation of this invention is dependent on the particular indirect rotor position determining technique chosen. Rotor position estimator 60 may include any one of the many indirect methods known to those of ordinary skill in the art. An important aspect of the invention is that rotor position estimator 60 internally generates a rotor position error signal using information from sensor means 52 (i.e., $\theta_c$), and the estimated rotor position (i.e., $\hat{\theta}$). The rotor position error signal is then used by the selected indirect rotor position determining technique to determine an updated estimated rotor position $\hat{\theta}$. In the preferred embodiment, an observer-based state variable technique is employed to implement rotor position estimator 60. However, it should be apparent that the use of the internally generated rotor position error signal to correct the estimated rotor position signal $\hat{\theta}$ can be extended to and used in conjunction with other indirect position sensing methods. For example, indirect rotor position determining techniques known by those of ordinary skill in the art include frequency modulation, phase modulation, and amplitude modulation schemes described in "New Modulation Encoding Techniques for Indirect Rotor Position Sensing in Switched Reluctance Motors," M. Ehsani, I. Husain, S. Mahajan, and K. Ramani, *IEEE Trans. Industry Applications*, vol. IA-30, no. 1, pp 85–91, January/February 1994; and "Elimination of Discrete Position Sensor and Current Sensor in Switched Reluctance Motor Drives," M. Ehsani, I. Husain and A. B. Kulkarni, *IEEE Trans. Industry Applications*, vol. IA-28, no. 1, pp. 128–135, January/February 1992; a dual decay method found in "Dual-Decay Converter for Switched Reluctance Motor Drives in Low-Voltage Applications," M. Ehsani, I. Husain, K. Ramani, and J. Galloway, *IEEE Trans. Power Electronics*, vol. PEE-8, no. 2, pp. 224–230, April 1994; or a mutual inductance scheme described in "Rotor Position Sensing in Switched Reluctance Motor Drives by Measuring Mutually Induced Voltages," Husain and M. Ehsani, *IEEE Trans. Industry Applications*, I vol. IA-30, no. 3, pp. 665–672, May/June 1994.

Figure 6:
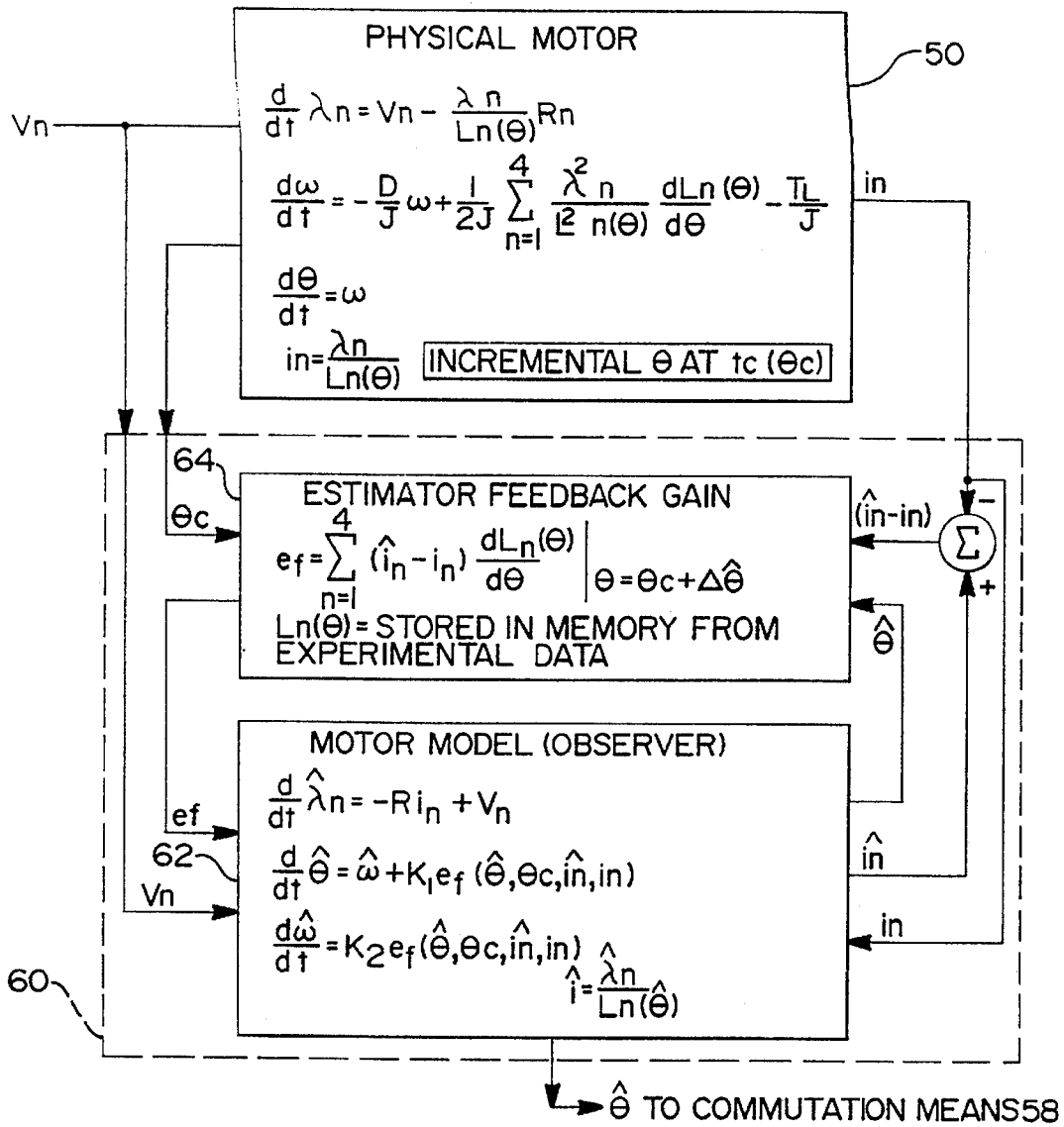
FIG. 6 is a simplified block diagram view showing in greater detail the rotor position estimator of FIG. 5, illustrating particularly a preferred observer-based state variable embodiment in accordance with the present invention.

FIG. 6 shows rotor position estimator 60 in greater detail, including rotor position modelling means 62, and means 64 for generating an error function $e_f$. As indicated above, in the preferred embodiment, means 62, 64 employs an observer-based state variable estimation technique, although any other known indirect method may be used. As background, in the observer, the dynamics of the motor are modelled in state space, and a mathematical model is run in parallel with the real machine. The model has the same inputs as the physical machine, and the difference between the model's outputs, and the measured machine outputs are used to force the estimated state variables to converge. Conventional observer-based rotor position estimators for switched reluctance machines have used phase current, and phase voltage signals to develop the observer model. As indicated above, the present invention further employs a position error signal derived from a low resolution rotor position sensor means 52 to further force the state variables to converge.

Figure 7:
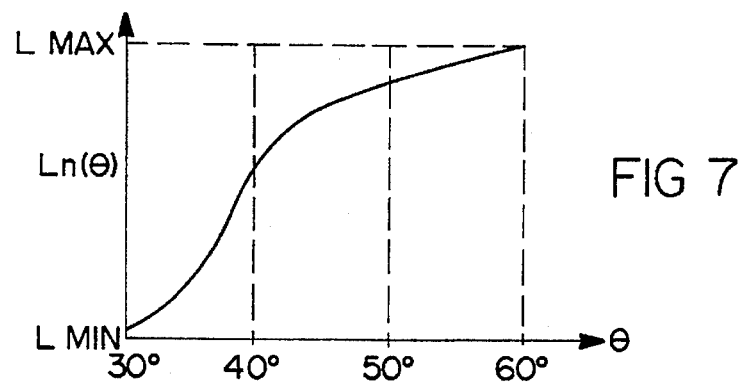
FIG. 7 is a simplified graph view showing the relationship between the inductance of a stator winding and rotor position.

To provide further background regarding the implementation of the preferred embodiment, and with continued reference to FIG. 6, a description of the model development, including assumptions, will be set forth. The equations used to model the physical 4-phase, 8-stator tooth, 6-rotor pole switched reluctance motor 50 are found below as equations (1), (2), and (3).

$$\frac{d}{dt} \lambda_n = v_n - \frac{\lambda_n}{L_n(\theta)} R_n \quad (1)$$

$$\frac{d\theta}{dt} = \omega \quad (2)$$

$$\frac{d\omega}{dt} = \frac{1}{2J} \sum_{n=1}^{4} \frac{\lambda_n^2}{L_n^2(\theta)} \frac{dL_n(\theta)}{d\theta} - \frac{T_L}{J} - \frac{D}{J} \omega \quad (3)$$

where:

$\lambda_n$=Flux linkage of phase n, where n is the phase number
$v_n$=Voltage applied to phase n
$L_n(\theta)$=Stator winding inductance of phase n
$\theta$=Rotor angular position $i_n$=Stator current in phase n
$R_n$=Stator resistance of phase n
$\omega$=Rotor angular velocity
J=Rotor inertia
$T_L$=Load torque on the rotor
D=Viscous damping In the above equations, $\lambda$, $\theta$, and $\omega$ are the state variables. $L_n(\theta)$ can be determined experimentally off-line and stored in the memory of controller 40 for retrieval during run-time. FIG. 7 shows an exemplary inductance versus rotor position ($\theta$) graph for the motor 50 described above.

As shown in FIG. 6, rotor position estimator 60 includes motor modeling means 62 for generating an estimated rotor position signal $\hat{\theta}$ indicative of the position of the rotor, and means 64 for generating an error function signal $e_f$, as a function of a rotor position error signal, determined using the estimated rotor position signal $\hat{\theta}$, and the direct rotor position signal, $\theta_c$. From equations (1)–(3), the following equations (4)–(7) may be obtained for use in modeling means 62 by incorporating an error function $e_f$ as is known in the art:

$$\frac{d}{dt} \hat{\lambda}_n = -R i_n + v_n + k_0 e_f \quad (4)$$

$$\frac{d}{dt} \hat{\theta} = \hat{\omega} + k_1 e_f \quad (5)$$

$$\frac{d}{dt} \hat{\omega} = k_2 e_f \quad (6)$$

$$\hat{i}_n = \frac{\hat{\lambda}_n}{L_n(\hat{\theta})} \quad (7)$$

where:

$\hat{\lambda}_k$=estimated flux linkage of phase n,
R=stator resistance of phase n,
$i_n$=measured stator winding current in phase n,
$v_n$=measured voltage applied to phase n,
$k_0$=a first constant,
$e_f$=a selected error function,
$\hat{\theta}$=estimated rotor angular position,
$\hat{\omega}$=estimated rotor angular velocity,
$k_1$=a second constant,
$k_2$=a third constant,
$\hat{i}_n$=estimated stator winding current in phase n, and,
$L_n(\hat{\theta})$=stator winding inductance of phase n.

The estimated parameter $\hat{\lambda}_n$ can be obtained by direct integration of equation (4), except for initial errors that occur due to initial conditions for the $n^{th}$ phase. For example, at low speed with no phase overlap (i.e., only one phase conducting at a time), the integration interval begins with the phase winding having been completely deenergized; thus, $i_n(0)=0$, $V_n(0)=0$, and $\lambda_n(0)=0$. With no initial errors, it is reasonable to assume $\hat{\lambda}_n=\lambda_n$. However, this assumption is not valid when phase advance strategies are employed, for example, which typically occur when motor 50 is operating at higher speeds. The reason is that since a prior phase winding is energized when the time arrives to energize the next phase winding, mutual coupling of flux occurs. Therefore, $\lambda_n(0)$ is greater than 0. This non-zero value (i.e., error) produces less accurate values in the predicted phase current $$\hat{i}_n = \frac{\hat{\lambda}_n}{L_n \hat{\theta}}$$

due to errors in $\hat{\lambda}_k$. This error in $\hat{i}_k$ tends to increase the time for rotor position modeling means 62 to converge, and further, decreases its stability at higher rotor speeds.

To simplify the complexity of rotor position modeling means 62, it is preferably assumed that $\hat{\lambda}_k = \lambda_k$, and further, that $k_0 = 0$. One aspect of this invention is to improve the performance of modeling means 62 (and thus rotor position estimator 60) when this assumption is made.

Based on the foregoing assumptions, equations (4)–(6) can be rewritten as equations (8)–(10) for use in modeling means 62:

$$\frac{d}{dt} \hat{\lambda}_n = -Ri_n + v_n \tag{8}$$

$$\frac{d\hat{\theta}}{dt} = \hat{\omega} + k_1 e_f(\hat{\theta}, \theta_c, \hat{i}_n, i_n) \tag{9}$$

$$\frac{d\hat{\omega}}{dt} = k_2 e_f(\hat{\theta}, \theta_c, \hat{i}_n, i_n) \tag{10}$$

The error function $e_f$ may be selected from one of a plurality of error functions known in the art. One requirement for the selected error function is that the dynamics of the rotor position modeling means 62 be stable; i.e., that errors in the state variables will converge to zero. Particularly, equations (11)–(12) define rotor position error $e_\theta$, and rotor angular velocity error $e_\omega$ for state variables $\theta$ and $\omega$:

$$e_\theta = \hat{\theta} - \theta \tag{11}$$

$$e_\omega = \hat{\omega} - \omega \tag{12}$$

Thus, the dynamics of rotor position modeling means 62 are described by equations (13)–(14) as shown below.

$$\frac{d}{dt} e_\theta = e_\omega + k_1 e_f \tag{13}$$

$$\frac{d}{dt} e_w = k_2 e_f \tag{14}$$

where the following is required for convergence:

$$\left. \begin{array}{l} e_\omega = 0 \\ e_\theta = 2p\pi \; p = \pm 0, 1, 2, \ldots \end{array} \right\} \text{ as } t \to \infty$$

Figure 8A:
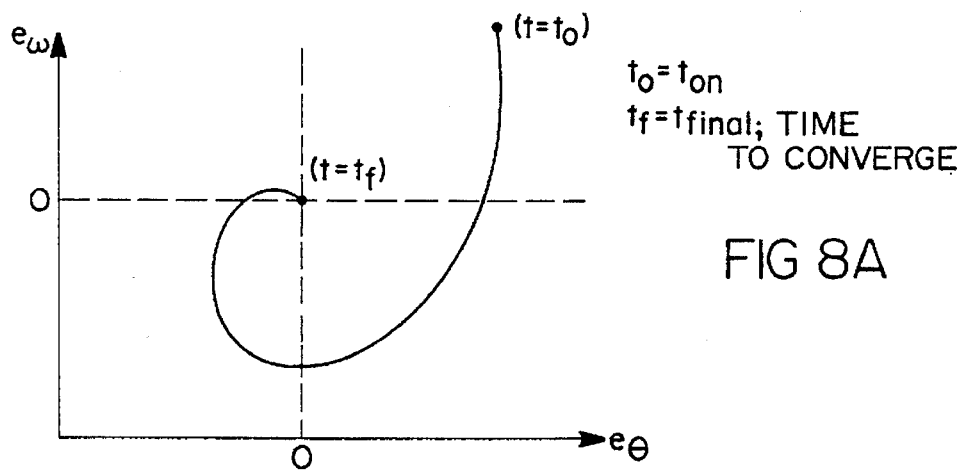
FIG. 8A is a simplified phase plane diagram illustrating a typical convergence pattern for a selected conventional error function.

Referring now to FIG. 8A, the requirement that the selected error function $e_f$ cause the modeling means 62 dynamics to converge is graphically illustrated. The initial point, $t_0$, represents the time when phase n is energized. The end point, $t_f$ is the time when the state variables (i.e., estimated values) converge on the actual values such that the estimated rotor position $\hat{\theta}$ is equal to the actual rotor position $\theta$, and the estimated rotor angular velocity $\hat{\omega}$ is equal to the actual rotor angular velocity $\omega$ (i.e., $e_\theta = 0$, and $e_\omega = 0$).

In the preferred embodiment, the selected error function has the general form as shown by equation (15):

$$e_f = \left( \sum_{n=1}^{N} \left( \frac{\hat{\lambda}_n}{L_n(\hat{\theta})} - i_n \right) \frac{dL_n(\theta)}{d\theta} \right)_{\theta - \hat{\theta}} \tag{15}$$

where:
N = total number of machine phases.

Thus, equations (8)–(10) may be rewritten as equations (16)–(18) shown below to include the selected error function $e_f$:

$$\frac{d}{dt} \hat{\lambda}_n = -Ri_n + v_n \tag{16}$$

$$\frac{d\hat{\theta}}{dt} = \hat{\omega} + k_1 \left( \sum_{n=1}^{4} \left( \frac{\hat{\lambda}_n}{L_n(\hat{\theta})} - i_n \right) \frac{dL_n(\theta)}{d\theta} \right)_{\theta - \hat{\theta}} \tag{17}$$

$$\frac{d\hat{\omega}}{dt} = k_2 \left( \sum_{n=1}^{4} \left( \frac{\hat{\lambda}_n}{L_n(\hat{\theta})} - i_n \right) \frac{dL_n(\theta)}{d\theta} \right)_{\theta - \hat{\theta}} \tag{18}$$

It should be appreciated that for satisfactory performance, the selected error function must converge quickly enough for high speed motor operations. Accordingly, it should be appreciated that a more complex error function than the preferred function may be selected (e.g., one containing squared terms) that would converge more quickly. However, it should be further appreciated that more complex error functions incur a computation penalty during evaluation (i.e., an error function including squared terms requires more multiplication operations than for the selected error function). As indicated above, the disclosed controller 40 is computationally satisfactory to carry out the error function selected in the preferred embodiment.

Motor torque ripple with respect to speed may be controlled by advancing the turn-on time of a phase winding. The turn-on time ($t_{on}$) typically, for 8/6 SRM 50, ranges from $30° \leq t_0 \leq 37°$.

Referring to FIG. 7, it should be appreciated from the foregoing discussion that normal non-overlapping phase control (low speed) occurs in a first region generally about 37°, while phase advance control (high speed) initiates winding energization during a second region extending down to 30°. In examining the inductance-versus-rotor position graph in these two regions, it should be apparent that the slope $$\left( \text{i.e., } \frac{dL_n(\theta)}{d\theta} \right),$$

is at a maximum between 35° and 40°. Thus, rotor position modeling means 62 is most sensitive to errors in the estimated rotor position, $\hat{\theta}$, over the region where $\theta_0 (\theta_0 = \theta(t_0))$ normally occurs during low speed operation (i.e., by affecting the values of $L_n(\hat{\theta})$ and $$\left( \frac{d}{d\theta} L_n(\theta) \right)_{\theta - \hat{\theta}}.$$

Thus, during low speed operation, the convergence time $t_f$ tends to be sensitive to errors in $\hat{\theta}$.

Figure 8B:
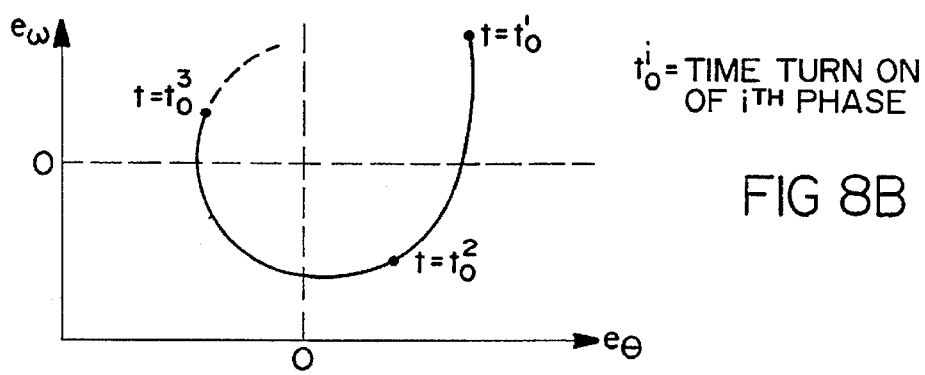
FIG. 8B is a phase plane diagram of a prior art switched reluctance motor system operating at high speed wherein time between phases is insufficient for convergence.

In contrast, at high speed operation, $\theta_0$ generally moves closer to 30° according conventional phase advance control strategies, and thus evaluation of $L_k(\hat{\theta})$ is less sensitive to errors in the estimated rotor position, $\hat{\theta}$. However, the phase winding conduction time, $t_c - t_0$, decreases. Accordingly, based on the foregoing, prior art observer-based state variable modeling systems did not have sufficient time to converge before the next phase winding was to be energized. This lack of convergence time limited high speed operation of the motor due to the stability of the rotor position estimator. Further, in general, the use of a phase advance control increases the error of $\hat{\lambda}_k$, due to a non-zero phase current in the prior phase winding that gives rise to a positively-valued flux in the next phase winding to be energized: $\hat{\lambda}_k(t_0)>0$. The error thereby introduced in $\hat{\lambda}_k$ further increases the convergence time $t_r$. FIG. 8B illustrates the non-convergence of a prior art rotor position estimator.

The advance occasioned by the present invention relates to providing measured rotor position values to force the state variables of rotor position modeling means 62 to converge more quickly under the foregoing circumstances. Although generally any form of measured rotor position information may be used, as indicated above, in the preferred embodiment, means 62 utilizes information of a measured value of $\theta_c^i$ (i.e., the commutation angle of the $i^{th}$ phase winding, which, in the illustrative embodiment, is 52°). Particularly, the strategy preferably employed by commutation means 58 maintains the commutation angle $\theta_c$ (i.e., turn-off angle) fixed for a given phase, while varying the turn-on angle, $\theta_0$, according to rotor speed. It should be appreciated that other motor control strategies may be employed while not departing from the spirit and scope of the present invention. The means 64 thus provides for the use of direct rotor position information $\theta_c$ to develop an error position signal (in the form of an error function $e_f$) while means 62 determines rotor position approximations ($\Delta\hat\theta$) to adjust $\theta_0$ at various motor speeds (e.g., $\theta_0$ is advanced as motor speed increases).

Figure 8C:
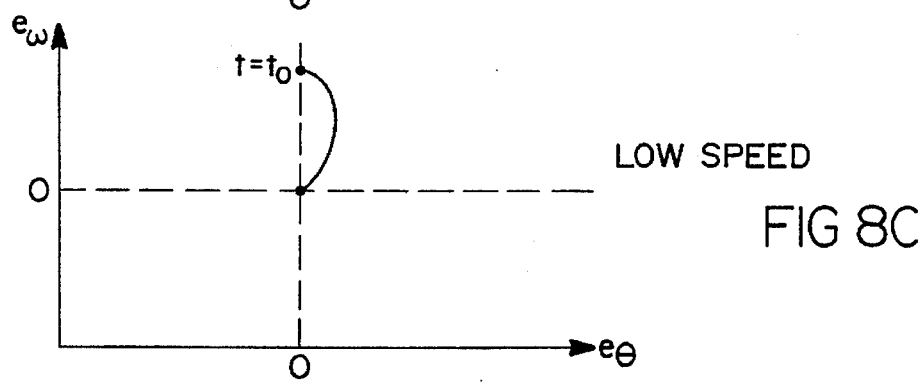
FIG. 8C is a phase plane diagram of a switched reluctance motor system employing the present invention for low speed motor operation.
Figure 8D:
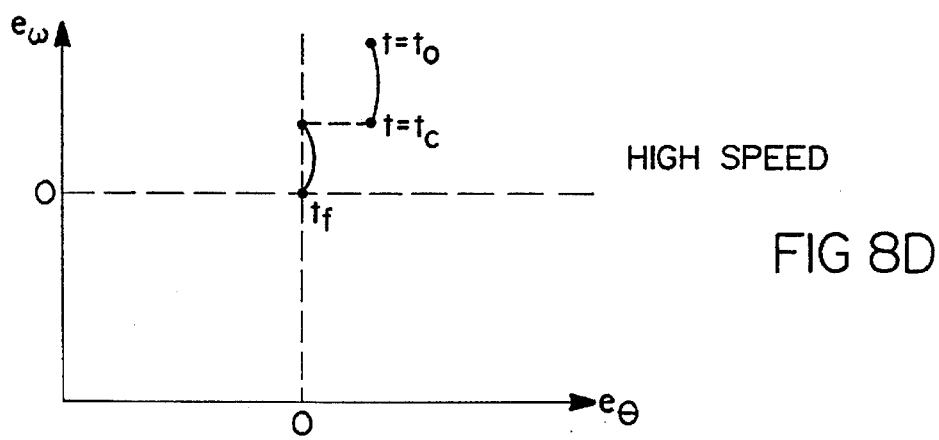
FIG. 8D is a phase plane diagram of a switched reluctance motor system employing the present invention operating at high speed, showing particularly how periodic introduction of direct rotor position information into the rotor position estimator forces convergence.

Referring now to FIGS. 8C, and 8D, the stability characteristics of the present invention are illustrated by reference to phase plane diagrams. At low speeds, with no phase overlap, the turn-off (i.e., commutation) of a prior phase coincides with the turn-on of the next phase. Thus, $\theta_0^1 = \theta_c^2$, $\theta_0^2 = \theta_c^3$, ... Thus, since direct rotor position information is provided at $t=t_0$, the rotor position error $e_\theta$ is zero: $e_\theta(t_0)=0$, as illustrated in FIG. 8C.

As motor speed increases, $\theta_0$ is advanced relatively, and phase winding conduction in multiple phases begin to overlap. In general, then, the rotor position error $e_\theta$ is nonzero: $e_\theta(t_0)>0$. However, $e_\theta$ will be set to 0 when $\theta_c$ is detected, and, further, will have a smaller initial value since $\hat\theta$, which is used to define $\theta_0$, is determined from the previous $\theta_c$. Accordingly, the estimated rotor position $\hat\theta$ is a composite of direct and indirect terms: $\hat\theta=\theta_c(\text{direct})+\Delta\hat\theta(\text{indirect})$. Stated another way, when transitions are received by means 62, $\hat\theta=\theta_c$, and there is no position error. During the interval until the next transition is received, $\Delta\hat\theta$ is continuously calculated and added to the value of $\theta_c$ to obtain $\hat\theta$. At the next transition, the estimated $\hat\theta$ is again set to $\theta_c$. A more accurate estimated rotor position $\hat\theta$ will give rise to less error in the $L_k(\hat\theta)$, and $$\frac{dL(\theta)}{d\theta}$$

terms of the error function $e_f$. In the illustrative embodiment, rotor position modeling means 62 will therefore converge, as indicated in FIG. 8D, even during high-speed operation.

It should be appreciated that the error function $e_f$ shown in equation (15), and the state equations (16)–(18) incorporating the error function $e_f$ may be solved numerically using a conventional controller, such as controller 40 by employing widely available and well-known numerical methods. For example, integration techniques such as the Euler or Runge-Kutta methods may be employed to solve the state equations in real-time. Such an implementation requires no more than routine application of well-known programming methods.

Referring to FIG. 5, gate drive means 46 is conventional in the art, and may be constructed using commercially available components, for example, component model number IR2110 manufactured by International Rectifier, which may be configured to directly drive the power switching devices of converter 48. Alternatively, gate drive means 46 may also include a commercially available component model TSC4424 manufactured by Texas Instruments to provide the drive signals for power switches in converter 48. Preferably, both types of components are used, as described in more detail below.

FIG. 9 shows converter 48 in greater detail. Motor 50 includes four phases A, B, C, D, which correspond to the four coils depicted in FIG. 9 labelled A, B, C, and D. Diagrammatically represented switches $S_A$, $S_C$, $S_B$, $S_D$, $S_{AC}$, and $S_{BD}$ may be implemented or constructed using commercially available power switching devices, such as power MOSFET or IGBT devices. Converter 48 is conventional in the art. Furthermore, it should be appreciated that the converter topography selected and illustrated in FIG. 9 is only one of a plurality of those known in the art, and which may be used and remain within the spirit and scope of the present invention. Switches $S_A$ and $S_{AC}$ are driven by a first component model IR2110 (not shown), with a first component model TSC4424 (not shown) driving switch $S_c$, while a second component model IR2110 (not shown) drives switches $S_B$ and $S_{BD}$, with a second component model TSC4424 (not shown) driving switch $S_D$.

Referring to FIG. 5 sensor means 52 includes sensor target magnets 66, and Hall-effect sensors and conditioning circuitry 68. In the preferred embodiment, four Hall-effect sensors are used to detect a rotor position with 15° (mechanical) of resolution. Thus, a transition signal is generated by sensing means 52 every 15°. Preferably, this transition coincides with the commutation angle $\theta_c$, that, in accordance with the selected control strategy employed by commutation means 58, is fixed at 52° for each phase of motor 50. Thus, direct rotor position information is available at every transition. The details involved in constructing the above-described Hall-effect sensor configuration are well-known in the art and thus will not be described in detail.

It should be appreciated that the position information generated by rotor position sensing means 52 need not coincide with the commutation angle $\theta_c$; the actual rotor position only need be known when the transition is received, or, equivalently, the actual rotor position be encoded in some fashion onto the signal provided by means 52. Moreover, it should be appreciated that the number of sensors need not be the same as the number of machine phases. A lower number of sensors providing direct rotor position information may be employed and remain within the spirit and scope of the present invention. Finally, the sensor means 52 need not provide actual rotor position information at any finer resolution than one stroke angle, $\epsilon$, where $$\epsilon = \frac{360°}{(\text{number of phases})(\text{number of rotor poles})}.$$

Position information of any finer resolution does not substantially improve the performance of estimator 60. Further, decreasingly cruder rotor position information nonetheless improves estimator 60 performance compared with indirect methods alone.

With continued reference to FIG. 5, current sensor 54 may take any one of a plurality of conventional configurations known to those of ordinary skill in the art. In the illustrative embodiment, a current sensor circuit 54 for measuring phase current is constructed using a conventional operational amplifier (op amp). The op amp is a commercially available component, and may be, for example, model MC3404, manufactured by Motorola Semiconductor Products.

Voltage sensor 56 is conventional and well-known to one of ordinary skill in the art.

Referring now to FIG. 6, the operation/data flow of the present invention will now be set forth. As indicated above, rotor position estimator 60 is executed in parallel with the operation of physical switched reluctance motor 50. The phase voltage $v_n$ applied to the stator windings of motor 50 is sensed by voltage sensor 56 and is provided to modeling means 62. The phase current $i_n$ developed through a respective machine phase (i.e., stator winding) is measured continuously by current sensor 54 to generate a current signal $i_n$, which is also provided to modeling means 62. The measured current signal $i_n$ is further continuously provided to an inverting input of a summer to be subtracted from the model estimated current $\hat{t}_k$ to generate a current error signal ($\hat{t}_k - t_k$). The current error signal is provided as an input to block 64. The current error signal adjusts the state estimator feedback gain to improve the accuracy of the dynamic response of modeling means 62. Modeling means 62 generates an estimated rotor position signal $\hat{\theta}$, which is a continuously-valued parameter, and which is indicative of the position of the rotor, using the phase current signal $i_n$, the phase voltage signal $v_n$, and the error function $e_f$, which itself incorporates the direct rotor position $\theta_c$. The estimated rotor position signal $\hat{\theta}$ is used as an input to commutation means 58 for operating the motor drive to control the switched reluctance machine 50.

This invention adds a second error signal generated from, in the illustrative embodiment, a low resolution Hall-effect sensor configuration means 66, 68. The means 66, 68 combine to produce a transition at every stroke angle, $\epsilon$.

When a rotor position transition is detected by estimator 60, the actual rotor position, which is known ahead of time, is compared to the estimator rotor position $\hat{\theta}$. This position error signal is computed at discrete times and is used to adjust the feedback gain (i.e., the value of the error function, $e_f$). Particularly, as shown in block 64, the value for $\theta$ for evaluating $e_f$ is determined using the actual value at the transition, $\theta_c$, which, in the illustrative embodiment, is 52°, plus an incremental term $\Delta\hat{\theta}$ determined indirectly using means 62. Thus, accumulated errors due to numerical integration are corrected periodically whenever a rotor position error signal is generated. The rotor position error signal, in terms of its adjustment of the error function $e_f$, therefore improves both high speed operation where the accuracy of the state variables of rotor position modeling means 62 is limited by bandwidth (i.e., processing speed of controller 40), and at low speeds where accuracy is limited by accumulated numerical errors.

The present invention offers several significant advantages over conventional systems employing either one of direct or indirect rotor position sensing schemes. Because motor 50 may be operated by controller 40 using direct Hall sensor position measurements, a system employing the present invention can continue to operate after a momentary loss of power that would otherwise result in the loss of stored rotor position estimator data in conventional indirect methods. Further, in the event of a failed Hall sensing device, motor 50 will nonetheless still be able to be controlled by controller 40 with only a small loss in performance due to the inclusion of rotor position estimator 60. In addition, the low resolution rotor position information available at motor start-up ensures that the motor will begin turning in the desired direction without a "hunt and test" routine often needed by those systems employing conventional indirect methods. Moreover, the low resolution (i.e., "crude") position information improves the step response of motor 50 by reducing the need for initialization procedures required in conventional indirect methods. Finally, a device in accordance with this invention is of lower cost and higher reliability compared to direct high resolution-based systems, and further, is extremely versatile, insofar as the low-resolution position information may be combined with many known indirect techniques.

The preceding description is exemplary rather than limiting in nature. A preferred embodiment of this invention has been disclosed to enable one skilled in the art to practice the invention. Variations and modifications are possible without departing from the purview and spirit of this invention; the scope of which is limited only by the appended claims.

What is claimed:

1. A device for determining a position of a rotor associated with a switched reluctance machine of the type having a plurality of stator windings forming a plurality of corresponding machine phases, said device comprising:

sensor means for generating a direct rotor position signal corresponding to an actual position of said rotor;

a rotor position estimator responsive to at least one measured machine operating characteristic, and said direct rotor position signal for substantially continuously generating an estimated rotor position signal indicative of the position of said rotor; and, wherein said rotor has a first predetermined number of poles, said machine has a second predetermined number of phases, and wherein said sensor means is operative to detect said rotor position and generate said direct rotor position signal at no finer resolution than one stroke angle, said stroke angle being determined as follows:

stroke angle=(360/(said first predetermined number)* (said second predetermined number)).

2. The device of claim 1 further comprising a voltage sensor for generating a phase voltage signal, and a current sensor for generating a phase current signal, and wherein said measured operating characteristic includes said phase voltage and said phase current signals.

3. The device of claim 1 wherein said sensor means includes at least one Hall-type sensor.

4. The device of claim 1 wherein said rotor position estimator includes means for generating an error function signal corresponding to a rotor position error determined as a function of said estimated rotor position signal and said direct rotor position signal.

5. The device of claim 4 wherein said rotor position estimator means further includes means responsive to said error function signal for generating said estimated rotor position signal according to an observer based state estimator.

6. The device of claim 1 wherein said rotor position estimator means includes observer based state estimator means responsive to a phase voltage signal, a phase current signal and said direct rotor position signal for generating said estimated rotor position signal.

7. The device of claim 1 wherein said rotor position estimator includes means for further substantially continuously generating an estimated rotor speed signal indicative of an actual speed of said rotor.

8. The device of claim 1 wherein said sensor means is configured to detect said actual position of said rotor at an angular position of said rotor corresponding to a commutation event.

9. A device for controlling a switched reluctance machine of the type having a rotor and a plurality of stator windings forming a plurality of corresponding machine phases, said device comprising:

a rotor position sensor for detecting an actual rotor position and generating a direct rotor position signal corresponding to said detected position;

a rotor position estimator responsive to said direct rotor position signal and at least one measured machine operating characteristic for substantially continuously generating an estimated rotor position signal indicative of the position of said rotor;

commutation means responsive to said estimated rotor position signal for controlling commutation of said machine phases;

wherein said rotor has a first predetermined number of poles, said machine has a second predetermined number of phases, and wherein said rotor position sensor is operative to detect said rotor position and generate said direct rotor position signal at no finer resolution than one stroke angle, said stroke angle being determined as follows:

stroke angle=(360°/(said first predetermined number)* (said second predetermined number)).

10. The device of claim 9 further comprising a current sensor for detecting a current through at least one of said machine phases and generating said phase current signal wherein said phase current signal is indicative of the detected current, and a voltage sensor for detecting a voltage applied to said one machine phase and generating said phase voltage signal wherein said phase voltage signal is indicative of the detected voltage, and wherein said measured machine operating characteristic includes at least one of said phase current signal and said phase voltage signals.

11. The device of claim 10 wherein said rotor position estimator includes observer-based state estimator means responsive to said phase voltage signal, said phase current signal, and said direct rotor position signal for generating said estimated rotor position.

12. The device of claim 9 wherein said rotor position sensor includes at least one Hall-type sensor.

13. The device of claim 9 wherein the actual rotor position is a predetermined angular rotor position and said direct rotor position signal transitions when said rotor is substantially in said predetermined angular position.

14. The device of claim 13 wherein said rotor position estimator includes means for detecting said transitions and correcting said estimated rotor position to said predetermined angular rotor position.

15. In a system including a switched reluctance machine of the type having a rotor and a plurality of stator windings forming a plurality of corresponding machines phases, a method of controlling a switched reluctance machine comprising the steps of:

(A) generating at least one machine operating characteristic signal corresponding to the operation of the switched reluctance machine;

(B) generating a direct rotor position signal indicative of an actual position of the rotor, wherein said rotor position signal is generated at no finer resolution than one stroke angle;

(C) generating in a substantially continuously fashion an estimated rotor position signal using the machine operating characteristic signal, and the direct rotor position signal; and, (D) controlling the switched reluctance machine using the estimated rotor position signal generated in step (C).

16. The method of claim 15 wherein step (A) includes the substeps of:

generating a phase voltage signal;

generating a phase current signal; and wherein step (C) includes the substep of:

generating the estimated rotor position signal using the phase voltage signal, the phase current signal, and the direct rotor position signal using an observer based state variable technique.

17. The method of claim 15 wherein step (D) includes the substep of:

commutating the machine phases using the estimated rotor position signal generated in step (C).

* * * * *